(12) United States Patent
Abe

(10) Patent No.: US 11,436,226 B2
(45) Date of Patent: Sep. 6, 2022

(54) IDENTIFICATION OF DATA RELATED TO ANOTHER DATA SET WITHIN A DATA SET DESCRIBED BASED ON PLURAL ONTOLOGIES

(71) Applicant: FUJITSU LIMITED, Kawasaki (JP)

(72) Inventor: Shuya Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 16/583,952

(22) Filed: Sep. 26, 2019

(65) Prior Publication Data

US 2020/0117662 A1    Apr. 16, 2020

(30) Foreign Application Priority Data

Oct. 10, 2018   (JP) .............................. JP2018-192131

(51) Int. Cl.
  *G06F 16/2455*   (2019.01)
  *G06F 17/18*    (2006.01)
  *G06F 40/30*    (2020.01)

(52) U.S. Cl.
  CPC .......... *G06F 16/2455* (2019.01); *G06F 17/18* (2013.01); *G06F 40/30* (2020.01)

(58) Field of Classification Search
  CPC ....... G06F 16/2455; G06F 40/30; G06F 17/18
  See application file for complete search history.

(56) References Cited

U.S. PATENT DOCUMENTS

| 7,493,333 | B2* | 2/2009 | Hill | G06F 16/358 |
| 7,644,052 | B1* | 1/2010 | Chang | G06N 5/022 |
| | | | | 706/45 |
| 8,793,208 | B2* | 7/2014 | Rojahn | G06F 16/367 |
| | | | | 706/50 |
| 2008/0294644 | A1* | 11/2008 | Liu | G06F 16/335 |
| 2010/0036788 | A1* | 2/2010 | Wu | G06F 16/20 |
| | | | | 706/47 |
| 2010/0228731 | A1* | 9/2010 | Gollapudi | G06F 16/955 |
| | | | | 707/737 |
| 2012/0173585 | A1 | 7/2012 | Pan et al. | |

(Continued)

FOREIGN PATENT DOCUMENTS

| JP | 2012-141955 | 7/2012 |
| JP | 2016-15124 | 1/2016 |
| JP | 2016-212853 | 12/2016 |

*Primary Examiner* — Alford W Kindred
*Assistant Examiner* — Tiffany Thuy Bui
(74) *Attorney, Agent, or Firm* — Staas & Halsey LLP

(57) ABSTRACT

A group of nodes corresponding to respective pieces of data included in a second data-set are identified from nodes in a first data-set described based on ontologies each defining a link referencing a node in the first data-set. A determination is made, on a path following links in the first data-set from each of the group of nodes, whether there is an association between a first ontology of a first link referencing a source node and a second ontology of a second link referencing a destination node. A common node, at which a first path from a first node and a second path from a second node intersect, is searched for by tracing links between the source node and the destination node based on a result of the determination, and a search result representing the common node, the first node, and the second node is output.

7 Claims, 14 Drawing Sheets

(56) References Cited

U.S. PATENT DOCUMENTS

2015/0186547 A1\* 7/2015 Byrne ..................... G06F 40/30
  707/609
2015/0379409 A1  12/2015 Hu et al.
2016/0321407 A1  11/2016 Muñoz-Jiménez et al.
2019/0079968 A1\* 3/2019 Griffith ............... G06F 16/9024

\* cited by examiner

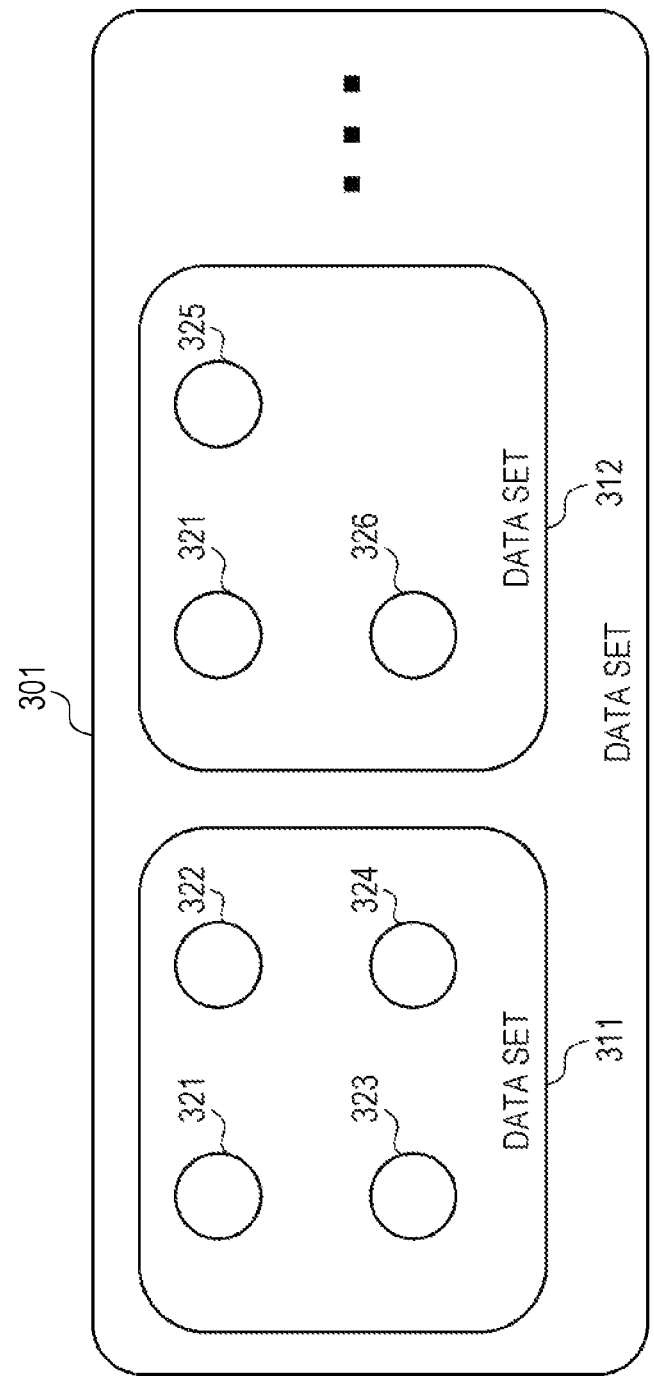

| NAME | LOCATION | TELEPHONE NUMBER |
|---|---|---|
| COMPANY FJ | KAWASAKI CITY, KANAGAWA PREFECTURE | aaaa-bbb-ccc |

| CORRESPONDING NODE | "COMPANY FJ" |
|---|---|
| CORRESPONDING NODE | "KAWASAKI CITY, KANAGAWA PREFECTURE" |
| CORRESPONDING NODE | "aaaa-bbb-ccc" |
| COMMON NODE | _:n1 |
| COMMON NODE | _:f |

IDENTIFICATION OF DATA RELATED TO ANOTHER DATA SET WITHIN A DATA SET DESCRIBED BASED ON PLURAL ONTOLOGIES

CROSS-REFERENCE TO RELATED APPLICATION

This application is based upon and claims the benefit of priority of the prior Japanese Patent Application No. 2018-192131, filed on Oct. 10, 2018, the entire contents of which are incorporated herein by reference.

FIELD

The embodiments discussed herein are related to identification of data related to another data set within a data set described based on plural ontologies.

BACKGROUND

In recent years, various data sets have been described in resource description framework (RDF) and different data sets are linked by RDF. Accordingly, different data sets may be analyzed in combination.

In RDF, three elements, which are a subject, a predicate, and an object, are used as a minimum unit, and this minimum unit is referred to as a triple. For example, for a triple (Company FJ, type of business, electronics), the subject is "Company FJ", the predicate is "type of business", and the object is "electronics". This triple describes information "The type of business of Company FJ is electronics".

The subject and the predicate are represented as Uniform Resource Identifiers (URIs) and the object is represented as a URI or literal (string). URI is written in angle brackets < > and literal is written in quotation marks " ". As URI, Uniform Resource Locator (URL) is used in some cases. In some cases, the predicate is referred to as an attribute or property and the object is referred to as the value for an attribute or the value for a property.

A data set described in RDF is a set of triples. In the case of describing a data set as a graph, the subject and the object of a triple are referred to as nodes and the predicate is referred to as a link or edge.

FIG. 1 illustrates an example of a data set described in RDF. A value beginning with a combination of an underline "_" and a colon ":", such as _:f, represents any URI. In the example, _:f, "Company FJ", "Kawasaki City, Kanagawa Prefecture", and "electronics" represent nodes and arrows of <name>, <location>, and <type of business> represent links. The arrow of a link indicates a reference direction, and the node at the origin of the arrow references a node at the end point of the arrow by the link. This data set represents that the name of some company is "Company FJ", the location is "Kawasaki City, Kanagawa Prefecture", and the type of business is "electronics".

The data set in FIG. 1 written in N-Triples format is as follows.
(_:f, <name>, "Company FJ")
(_:f, <location>, "Kawasaki City, Kanagawa Prefecture")
(_:f, <type of business>, "electronics")

The data set in FIG. 1 written in Turtle format is as follows:
_:f<name>"Company FJ";
<location> "Kawasaki City, Kanagawa Prefecture";
<type of business> "electronics".

In RDF, information is described according to the definition of some ontology. For example, in the case of describing information on a corporation in RDF, an ontology for the corporation is used. There are a plurality of ontologies for the same information in some cases. For example, as ontologies for a corporation, there are the Organization Ontology, Common Vocabulary Framework, and so on. Information described based on different ontologies is described by using different structures and links even if the same information is described.

FIG. 2A and FIG. 2B illustrate examples of data sets described based on different ontologies. FIG. 2A illustrates an example of a data set described based on the Organization Ontology. In this example, _:f, ●, "Company FJ", and "Kanagawa Prefecture" represent nodes and arrows of <label>, <registered address>, <place>, and <region> represent links. Here, ● represents a blank node. This data set represents that the name of some company is "Company FJ" and the prefecture to which the address belongs is "Kanagawa Prefecture".

FIG. 2B illustrates an example of a data set described based on Common Vocabulary Framework. In this example, _:f, ●, "Company FJ", and "Kanagawa Prefecture" represent nodes and arrows of <name>, <writing>, <address>, and <prefectures> represent links. In this data set, the same information as in the data set in FIG. 2A is described.

A single data set is described by combining a plurality of ontologies in some cases, and a complex data set is generated by coupling a plurality of data sets by links in other cases.

FIG. 3 illustrates an example of a complex data set. A data set 311 is described based on ontologies 321 to 324 and a data set 312 is described based on the ontology 321, an ontology 325, and an ontology 326. A data set 301 is generated by coupling a plurality of data sets including the data set 311 and the data set 312.

Among ontologies, there is a special ontology that is used for describing only a specific data set and there is a basic ontology that is used for describing various data sets.

With regard to RDF, a similarity-computation apparatus that uses open data to compute similarities between drugs, a computing apparatus that integrates non-conceptual data items into a data graph, and a method for obtaining hierarchical information of planar data are known (for example, see Japanese Laid-open Patent Publication No. 2016-212853, Japanese Laid-open Patent Publication No. 2016-15124, and Japanese Laid-open Patent Publication No. 2012-141955).

SUMMARY

According to an aspect of the embodiments, a group of nodes corresponding to respective pieces of data included in a second data set are identified from nodes in a first data set described based on ontologies each defining a link referencing a node in the first data-set. A determination is made, on a path following links in the first data-set from each of the group of nodes, whether there is an association between a first ontology of a first link referencing a source node from which tracing of links is to be started and a second ontology of a second link referencing a destination node at which the tracing of links is to be ended. A common node, at which a first path from a first node of the group of nodes and a second path from a second node of the group of nodes intersect, is searched for by tracing links between the source node and the destination node based on a result of the determination, and a search result representing the common node, the first node, and the second node is output.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a complex data set;

DESCRIPTION OF EMBODIMENTS

As described above, a plurality of data sets described in RDF may be coupled by links and such data sets may be analyzed in combination.

However, not all the data sets are described in RDF. For example, in some cases, a customer company list including attributes, such as official names, locations, and telephone numbers, of customers are described in comma-separated values (CSV) and open data of each company is described in RDF. In such cases, the correspondence relationship between a customer company list described in CSV and a data set described in RDF is unclear, and it is difficult to analyze these pieces of data in combination.

Such a problem arises not only in cases where a data set described in RDF and a data set described in CSV are associated with each other but also in cases where a data set described based on a plurality of ontologies and another data set are associated with each other.

It is desirable that, in a data set described based on a plurality of ontologies, a data portion related to another data set be identified.

Hereinafter, an embodiment will be described in detail with reference to the accompanying drawings.

Hereinafter, a data set that is described in RDF may be referred to as an RDF data set and a data set that is not described in RDF may be referred to as a non-RDF data set.

Figure 1:
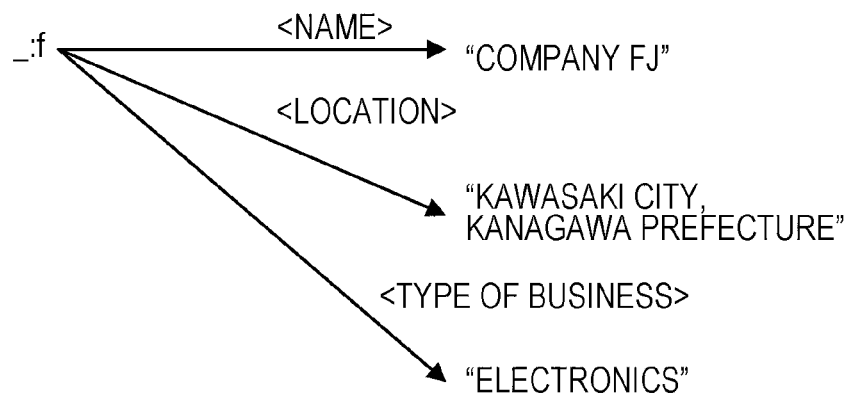
FIG. 1 is a diagram illustrating a data set described in RDF.
Figure 2A:
FIG. 2A and FIG. 2B are diagrams illustrating data sets described based on different ontologies.
Figure 2B:
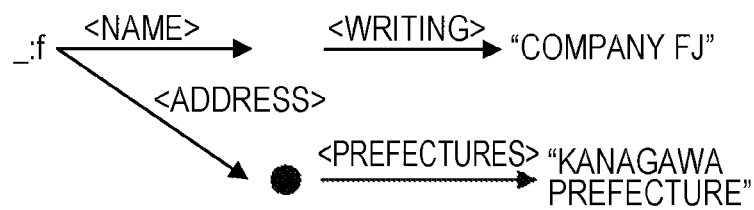
Figures 4A, 4B, 4C:
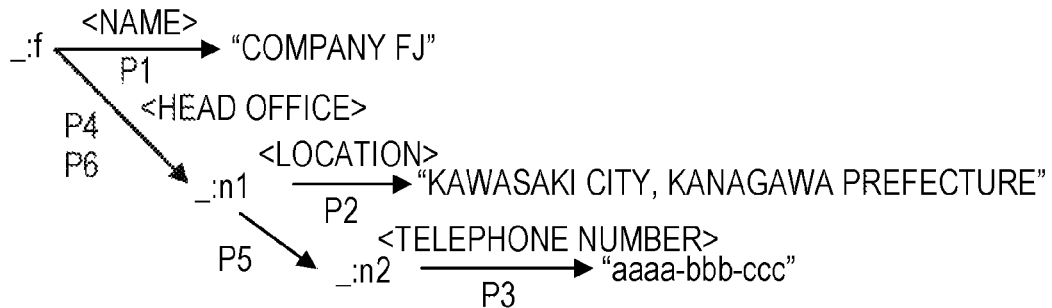
FIG. 4A, FIG. 4B, and FIG. 4C are diagrams illustrating a process of associating a customer company list with open data of a company.

FIG. 4A, FIG. 4B, and FIG. 4C illustrate an example of a process of associating a customer company list with open data of a company. FIG. 4A illustrates an example of a customer company list described in CSV. In this example, the name, the location, and the telephone number of Company FJ are recorded in the customer company list.

FIG. 4B illustrates an example of open data of a company described in RDF. In this example, _:f, _:n1, _:n2, "Company FJ", "Kawasaki City, Kanagawa Prefecture", and "aaaa-bbb-ccc" represent nodes, and arrows of <name>, <head office>, <location>, and <telephone number> represent links. This RDF data set represents that the name of the company is "Company FJ", the location of the head office is "Kawasaki City, Kanagawa Prefecture", and the telephone number of the head office is "aaaa-bbb-ccc".

FIG. 4C illustrates an example of a result of associating the customer company list in FIG. 4A with the open data in FIG. 4B. A corresponding node represents a node having a literal corresponding to data included in the customer company list in the RDF data set, and a common node represents a node that directly or indirectly references two or more corresponding nodes.

When a common node directly references a corresponding node, there is one link from the common node to the corresponding node, whereas when a common node indirectly references a corresponding node, there are two or more links from the common node to the corresponding node via one or more nodes.

For example, the common node '_:n1' directly references the corresponding node "Kawasaki City, Kanagawa Prefecture" by the link <location> and indirectly references the corresponding node "aaaa-bbb-ccc" via the node '_:n2'.

Another common node '_:f' directly references the corresponding node "Company FJ" by the link <name> and indirectly references the corresponding node "Kawasaki City, Kanagawa Prefecture" via the node '_:n1'. The common node '_:f' indirectly references the corresponding node "aaaa-bbb-ccc" via the node '_:n1' and the node '_:n2'.

A computer may detect corresponding nodes by checking whether the string of each piece of data included in the customer company list in FIG. 4A matches the string of a literal that each node included in the RDF data set in FIG. 4B has. Thus, three corresponding nodes "Company FJ", "Kawasaki City, Kanagawa Prefecture", and "aaaa-bbb-ccc" are detected from the RDF data set.

Next, the computer may detect common nodes from the RDF data set by recursively performing a search process, which traces links in a direction opposite to the reference direction from each corresponding node (this direction being referred to simply as the opposite direction hereinafter), until no link to be traced remains. In the search process, if respective paths following links from a plurality of corresponding nodes intersect each other, a node corresponding to the point of intersection of paths is detected as a common node. For example, the computer performs the search process in the following procedure.

(P1) The computer follows the link <name>, which references "Company FJ", in the opposite direction on a path originating from the corresponding node "Company H" and detects the node '_:f'.

(P2) The computer follows the link <location>, which references "Kawasaki City, Kanagawa Prefecture", in the opposite direction on a path originating from the corresponding node "Kawasaki City, Kanagawa Prefecture" and detects the node '_:n1'.

(P3) The computer traces the link <telephone number>, which references "aaaa-bbb-ccc", in the opposite direction on a path originating from the corresponding node "aaaa-bbb-ccc" and detects the node '_:n2'.

(P4) The computer traces the link <head office>, which references '_:n1', in the opposite direction on the path originating from the corresponding node "Kawasaki City, Kanagawa Prefecture" and detects the node (P5) The computer traces the link, which references '_:n2', in the opposite direction on the path originating from the corresponding node "aaaa-bbb-ccc" and detects the node '_:n1'.

(P6) The computer traces the link <head office>, which references in the opposite direction on the path originating from the corresponding node "aaaa-bbb-ccc" and detects the node '_:f'.

In this case, three paths respectively originating from "Company FJ", "Kawasaki City, Kanagawa Prefecture", and "aaaa-bbb-ccc" intersect at the node '_:f', and therefore the node '_:f' is detected as a common node. Two paths respectively originating from "Kawasaki City, Kanagawa Prefecture" and "aaaa-bbb-ccc" intersect at the node '_:n1', and therefore the node '_n1' is also detected as a common node.

In this way, identifying corresponding nodes and common nodes in an RDF data set allows a range of nodes directly or indirectly referenced from the common nodes to be identified as a data portion related to a non-RDF data set. Thus, the non-RDF data set is associated with the RDF data set. This enables these data sets to be analyzed in combination.

By way of example, the case where, in the RDF data set in FIG. 4B, the node '_:f', the node '_:n1', or the node '_n2' references another node by another link (not illustrated) is assumed. Information possessed by another node may be information about a sales location, an office, a factory, or the like that is not included in the customer company list. In this case, the computer may obtain and analyze information possessed by another node by tracing another link in the reference direction.

In the complex RDF data set illustrated in FIG. 3, a data portion related to a non-RDF data set among all the coupled data sets is at most one or two data sets in many cases. In such cases, searching all the coupled data sets involves searching unrelated data sets, and therefore the time complexity and space complexity are enormous.

Figure 5:
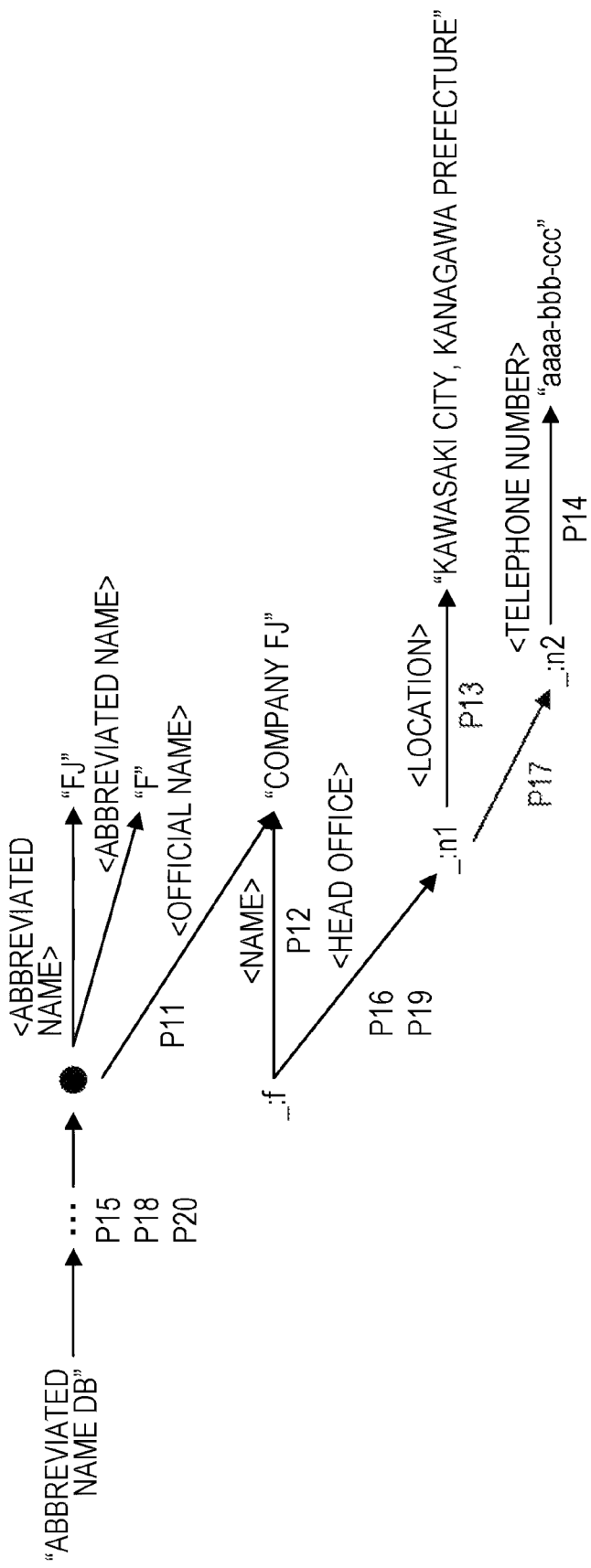
FIG. 5 is a diagram illustrating a search process in a complex RDF data set.

FIG. 5 illustrates an example of a search process in a complex RDF data set including the RDF data set in FIG. 4B. In the RDF data set in FIG. 5, information of company database (DB) and information of abbreviated name DB are mixed. In this example, "abbreviated name DB", "FJ", and "F" represent nodes and arrows of <abbreviated name> represent links.

In this case, to identify a data portion related to the customer company list in FIG. 4A, the computer performs a search process in the following procedure.

(P11) The computer traces a link <official name>, which references "Company FJ", in the opposite direction on a primary path originating from the corresponding node "Company FJ" and detects a blank node ●.

(P12) The computer traces the link <name>, which references "Company FJ", in the opposite direction on a secondary path originating from the corresponding node "Company FJ" and detects the node '_:f'.

(P13) The computer traces the link <location>, which references "Kawasaki City, Kanagawa Prefecture", in the opposite direction on the path originating from the corresponding node "Kawasaki City, Kanagawa Prefecture" and detects the node '_:n1'.

(P14) The computer traces the link <telephone number>, which references "aaaa-bbb-ccc", in the opposite direction on the path originating from the corresponding node "aaaa-bbb-ccc" and detects the node ':n2'.

(P15) The computer traces a link that references ●, in the opposite direction on the primary path originating from the corresponding node "Company FJ".

(P16) The computer traces the link <head office>, which references '_:n1', in the opposite direction on the path originating from the corresponding node "Kawasaki City, Kanagawa Prefecture" and detects the node (P17) The computer traces a link that references '_:n2', in the opposite direction on the path originating from the corresponding node "aaaa-bbb-ccc" and detects the node '_:n1'.

(P18) The computer traces a link next to the link that references •, in the opposite direction on the primary path originating from the corresponding node "Company FJ".

(P19) The computer traces the link <head office>, which references in the opposite direction on the path originating from the corresponding node "aaaa-bbb-ccc" and detects the node '_:f'.

(P20) The computer traces the next link but one, in the opposite direction on the primary path originating from the corresponding node "Company FJ".

As in the case of the RDF data set in FIG. 4B, the range of nodes directly or indirectly referenced from the common node '_:f' is the data portion related to the customer company list. The process in the procedure steps (P11), (P15), (P18) and (P20) for tracing links on the path including the blank node ● would therefore normally be unnecessary. For example, in the case where many links are included in the path including the blank node ●, the computational complexity for tracing these links is enormous. In a search process, if it is possible to search only a data set to which a corresponding node belongs, searching an unrelated data set is not required.

As illustrated in FIG. 3, each data set is described based on a specific set of ontologies. Accordingly, a way in which a data set to which a corresponding node belongs is determined, a set of ontologies that are often used in the determined data set is determined, and only nodes belonging to the set of ontologies are selected as search targets is conceivable. However, it is difficult to identify a set of ontologies that are often used in each data set.

Figure 6:
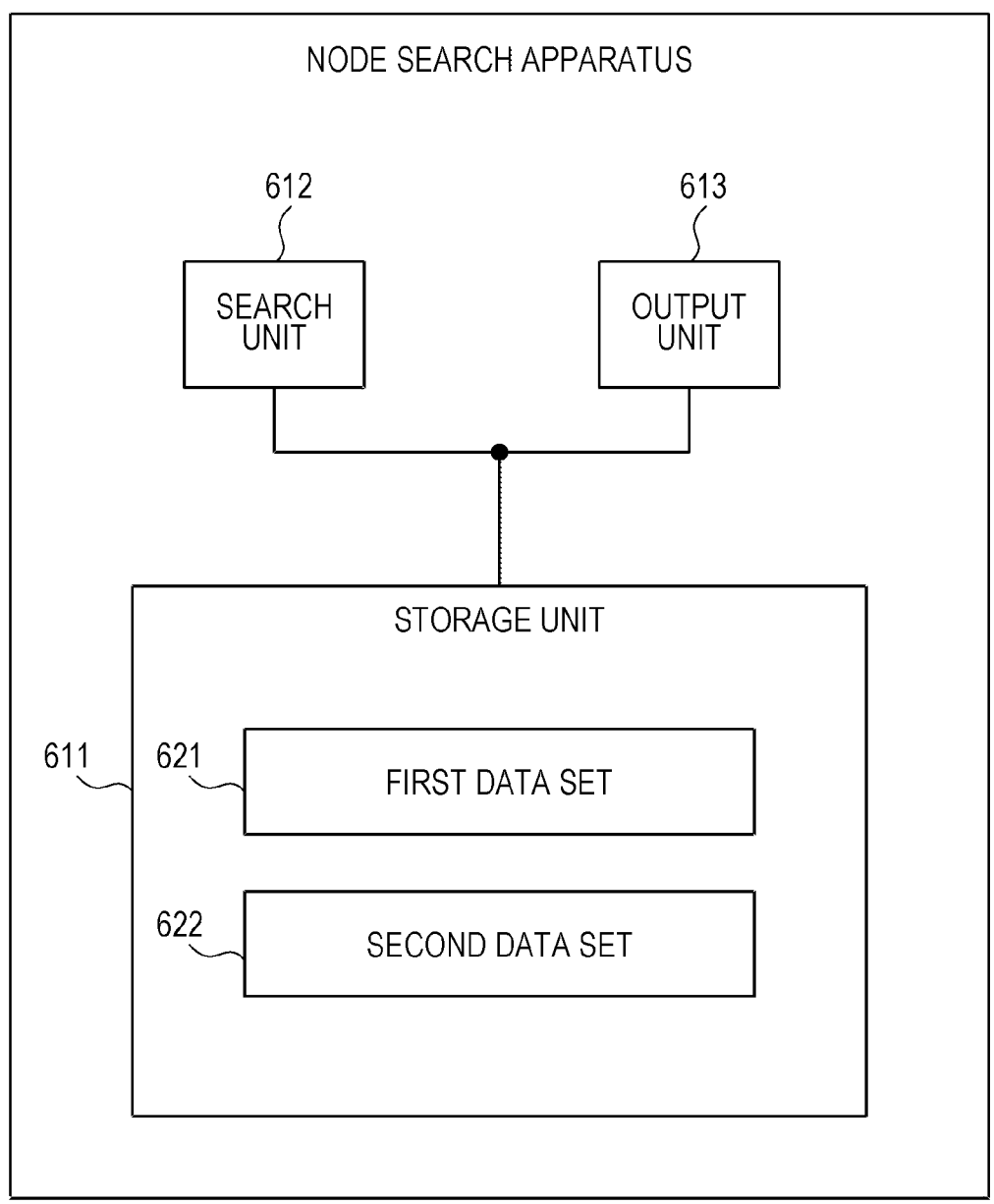
FIG. 6 is a diagram illustrating a functional configuration of a node search apparatus.

FIG. 6 illustrates an example of a functional configuration of a node search apparatus according to the embodiment. A node search apparatus 601 in FIG. 6 includes a storage unit 611, a search unit 612, and an output unit 613. The storage unit 611 stores a first data set 621 described based on a plurality of ontologies and a second data set 622. The search unit 612 performs a node search process by using the first data set 621 and the second data set 622.

Figure 7:
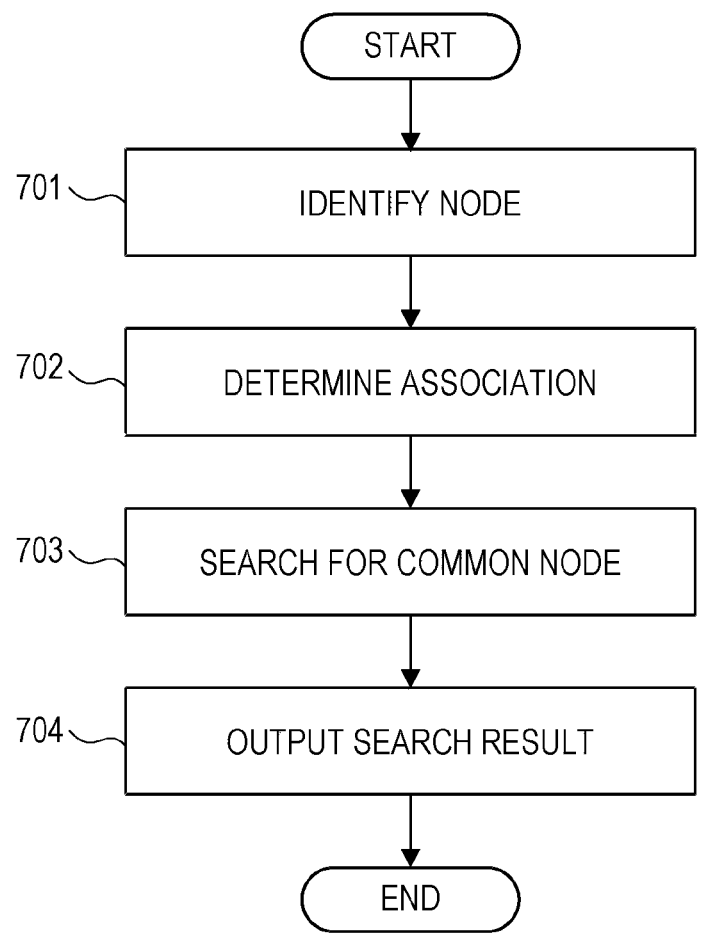
FIG. 7 is a flowchart of a node search process.

FIG. 7 is a flowchart illustrating an example of the node search process d performed by the node search apparatus 601 in FIG. 6. The search unit 612 first identifies, among nodes included in the first data set 621, a node corresponding to each of plural pieces of data included in the second data set 622 (step 701).

Then, on a path following links included in the first data set 621 from each of the plurality of identified nodes, the search unit 612 determines an association between the ontology of a source node and the ontology of a destination node (step 702).

The search unit 612 then searches for a common node, at which a first path and a second path intersect, by tracing links between the source node and the destination node based on a result of determining the association (step 703). The first path is a path that follows links from a first node among the plurality of identified nodes, and the second path is a path that follows links from a second node among the plurality of identified nodes.

Then, the output unit 613 outputs a search result including information representing the common node, information representing the first node, and information representing the second node (step 704).

With the node search apparatus 601 in FIG. 6, in a data set described based on a plurality of ontologies, a data portion related to another data set may be identified.

Figure 8:
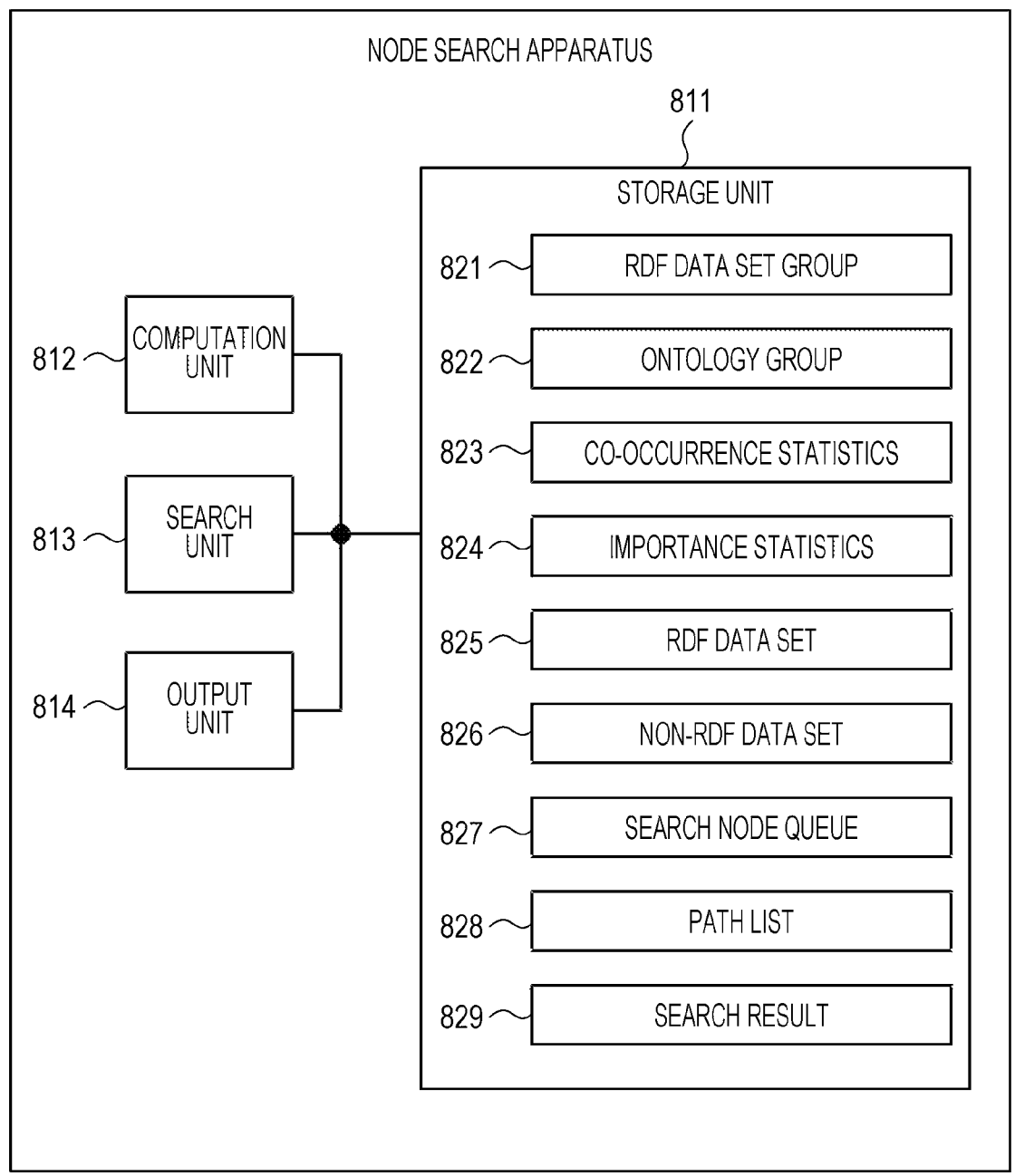
FIG. 8 is a diagram illustrating a functional configuration of a specific example of a node search apparatus.

FIG. 8 illustrates a specific example of the node search apparatus 601 in FIG. 6. A node search apparatus 801 in FIG. 8 includes a storage unit 811, a computation unit 812, a search unit 813, and an output unit 814. The storage unit 811, the search unit 813, and the output unit 814 correspond to the storage unit 611, the search unit 612, and the output unit 613 in FIG. 6, respectively.

The storage unit 811 stores an RDF data set group 821, an ontology group 822, an RDF data set 825, and a non-RDF data set 826. The RDF data set 825 and the non-RDF data set 826 correspond to the first data set 621 and the second data set 622 in FIG. 6, respectively.

The non-RDF data set 826 may be a data set described, for example, in CSV, tab-separated values (TSV), space-separated values (SSV), or Extensible Markup Language (XML) or implemented as a relational data model.

For example, the non-RDF data set 826 may be financial information of a loan recipient company possessed by a bank, and the RDF data set 825 may be open data of the company. In this case, associating these data sets with each other enables the financial information of the loan recipient company and the open data to be integrally analyzed and thereby enables determination of whether the bank may grant a loan to the company.

The non-RDF data set 826 may also be personal information of an executive officer of a company, and the RDF data set 825 may be open data of the company. In this case, associating these data sets with each other enables the personal information of the executive officer and the open data of the company to be integrally analyzed and thereby enables determination of whether the bank may deal with the company.

The RDF data set group 821 is a plurality of RDF data sets that are used for computing statistics on links, and the ontology group 822 is a plurality of ontologies for describing these RDF data set. Each link included in the RDF data set group 821 is defined by each ontology included in the ontology group 822.

For a combination of two links included in each RDF data set of the RDF data set group 821, the computation unit 812 determines the number of occurrences where these links simultaneously occur. The computation unit 812 then computes co-occurrence statistics 823 for the links by using the determined number of occurrences and stores the co-occurrence statistics 823 in the storage unit 811.

The computation unit 812 extracts words included in the label and the comment of each link from each ontology included in the ontology group 822 and determines the number of occurrences of each of words that occur in the label and the comment of each link. The computation unit 812 then computes importance statistics 824 indicating the importance of each word by using the determined number of occurrences and stores the importance statistics 824 in the storage unit 811.

The search unit 813 identifies, among nodes included in the RDF data set 825, a corresponding node corresponding to each of plural pieces of data included in the non-RDF data set 826. The search unit 813 then generates a search node queue 827 including the specified plurality of corresponding nodes and stores the search node queue 827 in the storage unit 811. The node registered in the search node queue 827 is used as a source node.

Then, on a path following links included in the RDF data set 825 in a direction opposite to the reference direction from each of the plurality of corresponding nodes included in the search node queue 827, the search unit 813 determines an association between the ontologies of the source node and the destination node. At this point, based on the co-occurrence statistics 823 and the importance statistics 824, the search unit 813 determines an association between ontologies, If the search unit 813 determines that there is an association between ontologies, the search unit 813 traces links between the source node and the destination node in the opposite direction and sets the destination node as a new source node in the search node queue 827. The search unit 813 then continues search on a path including the new source node.

The search unit 813 generates a path list 828 including a path that follows links included in the RDF data set 825 from each of a plurality of corresponding nodes and stores the path list 828 in the storage unit 811. The search unit 813 then continues search while updating the search node queue 827 and the path list 828, and thus searches for a common node at which the first path following links from a first corresponding node and the second path following links from a second corresponding node intersect.

If, in the middle of searching, the search unit 813 determines that there is no association between ontologies, the search unit 813 terminates the search on the path including the source node. The search unit 813 then generates a search result 829 including information representing the common node searched for, information representing the first node, and information representing the second node, and stores the search result 829 in the storage unit 811. The output unit 814 outputs the search result 829.

An ontology is considered as information that defines the link to be used and the structure in which the link is to be used. Accordingly, instead of directly handling ontologies and the relationship between ontologies, the computation unit 812 uses links and a relationship between links to compute the co-occurrence statistics 823 and the importance statistics 824. Thus, a set of ontologies that may be used together in the same data set may be identified based on the co-occurrence statistics 823 and the importance statistics 824.

Upon tracing links on a path, the search unit 813 estimates based on the co-occurrence statistics 823 and the importance statistics 824 whether it is possible to use the ontology of the source node and the ontology of the destination node together in the same data set. Only when it is possible to use these ontologies together, the search unit 813 traces links between the nodes and updates the path of the path list 828.

With the node search apparatus 801 in FIG. 8, identifying a corresponding node and a common node in the RDF data set 825 allows a range from the common node to the corresponding node to be identified as a data portion related to the non-RDF data set 826. Thus, data that is referenced from common nodes and is other than the related data portion may be obtained.

By way of example, the case where, in the RDF data set 825, a common node directly or indirectly references another node that is a node other than a corresponding node, and the other node possesses information that is not included in the non-RDF data set 826 is assumed. In this case, tracing links in the reference direction from the common node enables the information possessed by the other node to be obtained and analyzed.

If, in searching on a path, it is determined that there is no association between ontologies of the source node and the destination node, the search on the path is terminated and therefore search of a data portion irrelevant to the non-RDF data set 826 is omitted. Thus, the computational complexity for associating the RDF data set 825 with the non-RDF data set 826 may be reduced.

For example, when it is determined that, in the RDF data set in FIG. 5, there is no association between the ontologies of the corresponding node "Company FJ" and the blank node ●, the search on the path including these nodes is terminated. Thus, the process of tracing links on the path including the blank node ● is omitted, which reduces the computational complexity for associating the RDF data set with the customer company list.

Figure 9:
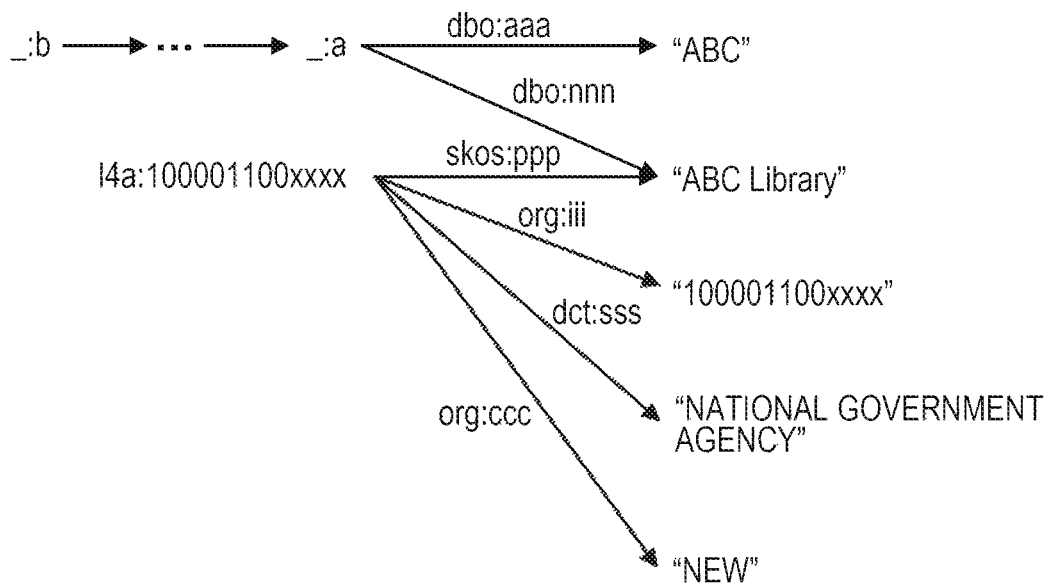
FIG. 9 is a diagram illustrating an RDF data set included in an RDF data set group.

FIG. 9 illustrates an example of an RDF data set included in the RDF data set group 821. In the example, _b, _:a, l4a:100001100xxxx, "ABC", "ABC Library", "100001100xxxx", "national government agency", and "new" represent nodes. Arrows of dbo:aaa, dbo:nnn, skos:ppp, org:iii, dct:sss, and org:ccc represent links.

In Turtle format of RDF, "dbo:", "skos:", "org:", "ergo", and "dct:" are referred to as prefixes and are used for omitting the head of URI. The conventions require that the same prefix be used for the same ontology, and therefore, in the example of FIG. 9, ontologies may be distinguished by prefixes. Accordingly, it is seen that the RDF data set in FIG. 9 is described based on four ontologies indicated by "dbo:", "skos:", "org:", and "dct:".

As the co-occurrence statistics 823, for example, pointwise mutual information (PMI) of the following expression may be used.

$$PMI(x, y) = \log\frac{p(x, y)}{p(x)p(y)} = \log\frac{\frac{K}{N}}{\frac{c(x)}{N} \cdot \frac{c(y)}{N}} \cong \log\frac{c(x, y)N}{c(x)c(y)} \quad (1)$$

In expression (1), PMI(x, y) represents the probability that the link x and the link y would co-occur, p(x) represents the occurrence probability that the link x would occur, and p(y) represents the occurrence probability that the link y would occur. Additionally, c(x) represents the number of occurrences where the link x occurs, c(y) represents the number of occurrences where the link y occurs, and c(x, y) represents the number of occurrences where the link x and the link y simultaneously occur. N represents the number of occurrences where all the links occur, and K represents the number of occurrences where all combinations (all co-occurrences) of two links occur.

The computation unit 812 first uses all RDF data sets included in the RDF data set group 821 to determine c(x), c(y), and N. The computation unit 812 then uses a single RDF data set including the link x and the link y to determine c(x, y). Further, the computation unit 812 uses expression (1) to compute PMI(x, y).

Figure 10A:
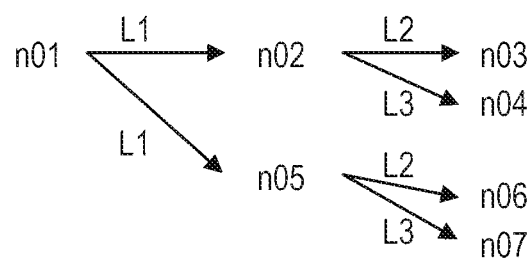
FIG. 10A and FIG. 10B are diagrams illustrating RDF data sets that are used to compute PMI(x, y)
Figure 10B:
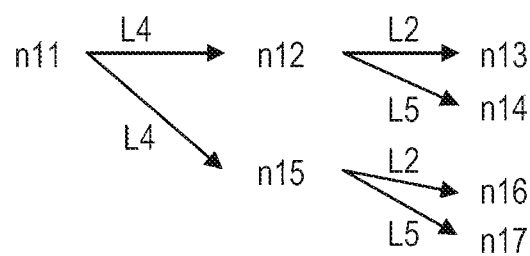

FIG. 10A and FIG. 10B illustrate examples of RDF data sets that are used to compute PMI(x, y). FIG. 10A illustrates an example of an RDF data set including a node n01. This RDF data set includes nodes n01 to n07 and links L1 to L3. FIG. 10B illustrates an example of an RDF data set including a node n11. This RDF data set includes nodes n11 to n17, the link L2, a link L4, and a link L5.

In such cases, the number of occurrences of each link and the number of occurrences where two links simultaneously occur are as follows. c(L1)=2 c(L2)=4 c(L3)=2 c(L4)=2 c(L5)=2 c(L1, L2)=4 c(L1, L3)=4 c(L1, L4)=0 c(L1, L5)=0 c(L2, L3)=4 c(L2, L4)=4 c(L2, L5)=4 c(L3, L4)=0 c(L3, L5)=0 c(L4, L5)=4

Since N=12, in the case where the base-10 logarithm is used as the log of expression (1), PMI(L1, L2), PMI(L1, L3) and PMI(L1, L4) are computed as follows.

$$PMI(L1, L2) \cong \log\frac{c(L1, L2)N}{c(L1)c(L2)} = \log\frac{4 \times 12}{2 \times 4} = 0.77 \quad (2)$$

$$PMI(L1, L3) \cong \log\frac{c(L1, L3)N}{c(L1)c(L3)} = \log\frac{4 \times 12}{2 \times 4} = 0.77 \quad (3)$$

$$PMI(L1, L4) \cong \log\frac{c(L1, L4)N}{c(L1)c(L4)} = \log\frac{0 \times 12}{2 \times 4} = NaN \quad (4)$$

In expression (4), NaN stands for not a number. PMI(x, y) for other combinations of links are computed as in expression (2) to expression (4).

The larger the number of occurrences where the link x and the link y simultaneously occur in each RDF data set, the larger PMI(x, y) in expression (1). Therefore, the larger PMI(x, y), the higher the possibility that the ontology that defines the link x and the ontology that defines the link y will be used together in the same RDF data set. Accordingly, the association between these ontologies may be determined by using PMI(x, y).

As the importance statistics 824, for example, tfidf(i, j) of the following expression may be used.

$$tfidf(i, j) = tf(i, j) \cdot idf(i) \quad (11)$$

$$tf(i, j) = \frac{n(i, j)}{\sum_k n(k, j)} \quad (12)$$

$$idf(i) = \log\frac{|D|}{|\{d : d \ni t(i)\}|} \quad (13)$$

In expression (12), n(i, j) represents the number of occurrences of a word t(i) in a link d(j) and $\sum_k n(k,j)$ represents the sum of the numbers of occurrences of all words in the link d(j). In expression (13), |D| represents the number of different links included in the RDF data set group 821 and |{d:dat(i)}| represents the number of links including the word t(i).

The computation unit 812 first extracts the link d(j) from all the RDF data sets included in the RDF data set group 821 and selects, among the ontology group 822, an ontology that defines the link d(j). The computation unit 812 then extracts words included in a label and a comment of the link d(j) from the selected ontology and determines the number of occurrences of the word t(i) that occurs in the extracted label and comment. Further, the computation unit 812 uses the obtained number of occurrences as n(i, j) to compute tfidf(i, j) from expressions (11) to (13).

Figure 11:
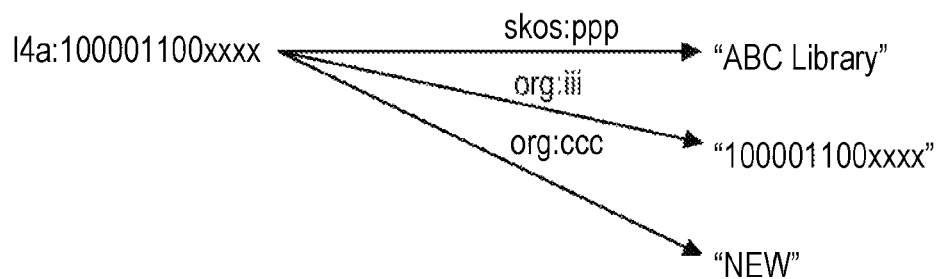
FIG. 11 is a diagram illustrating an RDF data set that is used to compute tfidf(i, j)

FIG. 11 illustrates an example of an RDF data set that is used for computing tfidf(i, j). In the example, 14a: 100001100xxxx, "ABC Library", "100001100xxxx", and "new" represent nodes, and arrows of skos:ppp, org:iii, and org:ccc represent links. As the label and the comment of each link, for example, the following text is extracted:
(link) skos:ppp
    label: ppp Ill
    comment: skos:ppp, skos:aaa and skos:hhh are p1 d1 p2. T12 r3 of skos:ppp is t12c4 of R5 p6 l7. A r8 h13 no m14 t15 one v9 of skos:ppp p16 l10 t11.
(link) org:iii
    label: iii
    comment: G1 an iii, s28 as a c2 r3 n4, t29 c30 be u31 to u32 to u5 i6 the organization. M7 d7 n9 and i10 iii s11 are a12. The o13 o14 is n15 to w33 s16 are u36. The p17 iii s11 s37 be i18 by the d19 of the iii v20. U38 d19 to d21 the n22 s11 u39 is c23 w40 r24 b25 p25 for 'skos:nnn' of w34 t35 p26 is a s27.
(link) org:ccc
    label: ccc bbb
    comment: I1 a c2 event w3 r4 in a c5 to t6 organization. D7 on the event the organization may or may not h12 c8 to e9 a10 the event. I11 of 'org:ooo'.

However, these labels and comments are virtual text for describing the embodiment.

In the case where only the RDF data set in FIG. 11 is included in the RDF data set group 821, the link d(j) is org:ccc, and the word t(i) is "organization", n(i, j) is two. The number of words included in the label of org:ccc is two and the number of words included in the comment is 32, and therefore the sum of the numbers of occurrences of all words is 34.

The number of different links included in the RDF data set in FIG. 11 is three, and the links whose labels and comments include "organization" are two links, which are org:iii and org:ccc. Accordingly, in the case where the natural logarithm is used as the log of expression (13), tfidf(i, j) is computed as follows.

$$tfidf(i,j) = 2/34 \log 3/2 = 0.024 \quad (14)$$

In the case where the link d(j) is org:ccc and the word t(i) is "event", n(i, j) is three and the link whose label and comment include "event" is only one link, org:ccc. In this case, tfidf(i, j) is computed as follows.

$$tfidf(i,j) = 3/34 \log 3/1 = 0.097 \quad (15)$$

For other combinations of links and words, tfidf(i, j) is computed as in expression (14) and expression (15).

The larger tfidf(i, j) of expression (11), the greater the importance of the word t(i) in the link d(j). Therefore, when tfidf(i, j) of the same word represents large values in two links, it is considered that the possibility that two ontologies that define these links will be used together in the same RDF data set is high. Accordingly, the association between these ontologies may be determined by using tfidf(i, j).

With reference to FIG. 12 to FIG. 18C, the operations of the node search apparatus 801 in FIG. 8 will be described in more detail next.

Figure 12:
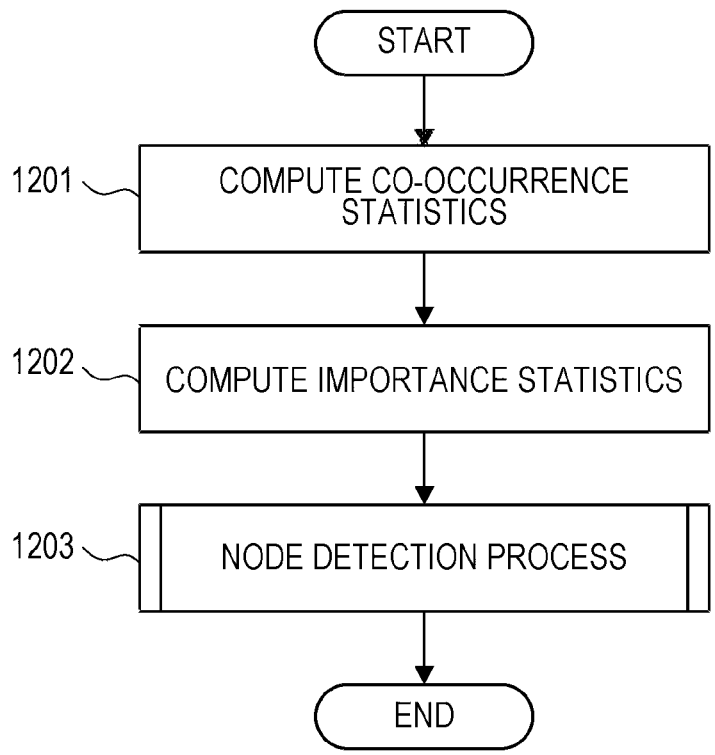
FIG. 12 is a flowchart illustrating a specific example of a node search process.

FIG. 12 is a flowchart illustrating a specific example of a node search process that is performed by the node search apparatus 801 in FIG. 8. First, for a combination of two links included in each RDF data set of the RDF data set group 821, the computation unit 812 computes the co-occurrence statistics 823 (step 1201).

The computation unit 812 then extracts words included in the label and the comment of each link included in the RDF data set group 821 and computes the importance statistics 824 for each word (step 1202). Further, the search unit 813 performs a node detection process by using the co-occurrence statistics 823 and the importance statistics 824 (step 1203).

Figure 13:
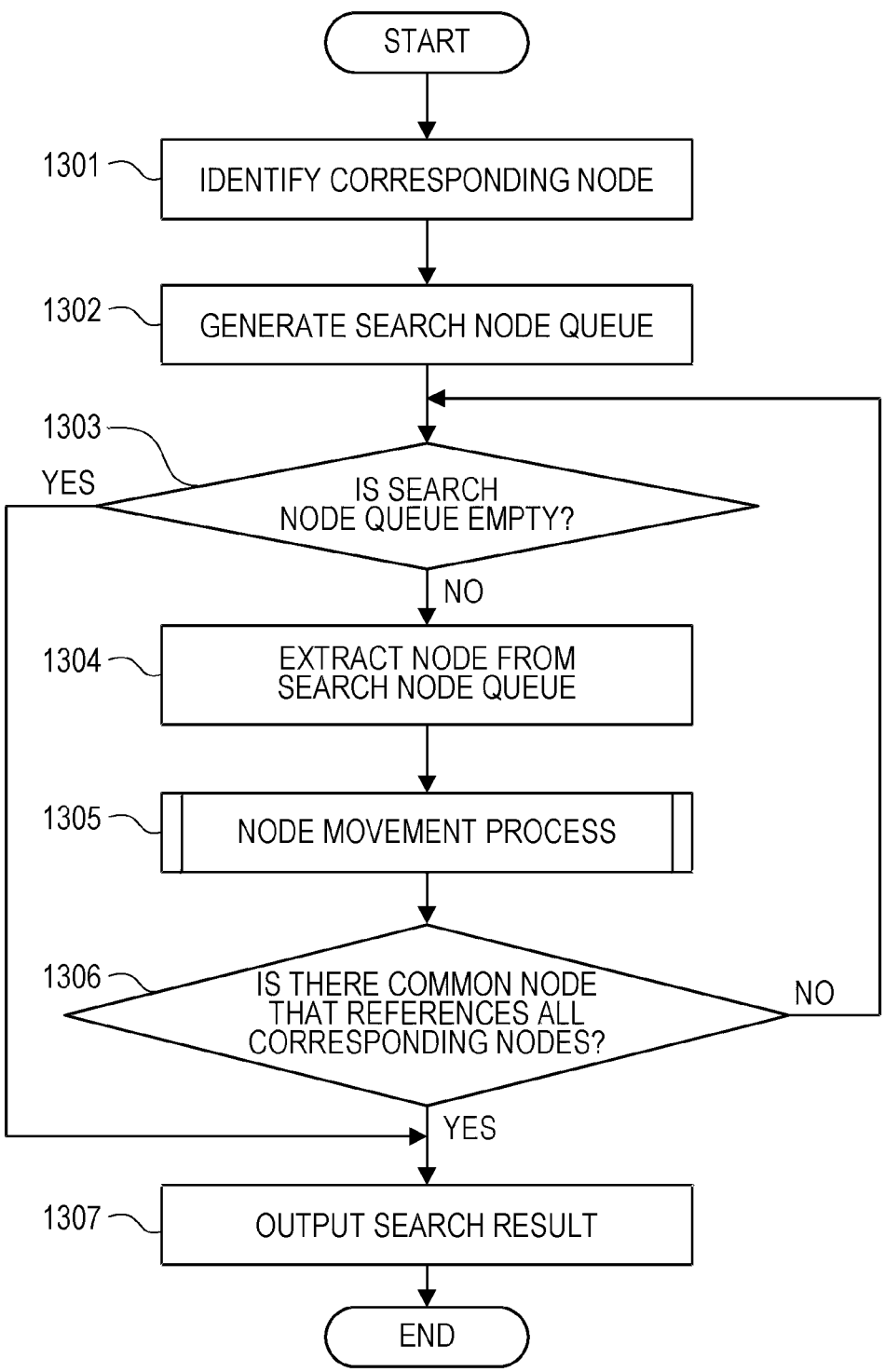
FIG. 13 is a flowchart of a node detection process.

FIG. 13 is a flowchart illustrating an example of the node detection process in step 1203 in FIG. 12. The search unit 813 first identifies, among nodes included in the RDF data set 825, a corresponding node corresponding to each of plural pieces of data included in the non-RDF data set 826 (step 1301).

At this point, the search unit 813 checks whether the string of each piece of data included in the non-RDF data set 826 matches a literal string that each node included in the RDF data set 825 has. The search unit 813 then identifies, as a corresponding node, a node having a literal that matches the string of each piece of data and generates the search node queue 827 including a plurality of corresponding nodes (step 1302).

Figure 14:
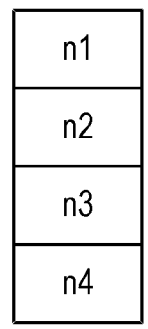
FIG. 14 is a diagram illustrating a search node queue.

FIG. 14 illustrates an example of the search node queue 827. In the search node queue 827 in FIG. 14, corresponding nodes n1 to n4 are registered.

The search unit 813 then checks whether the search node queue 827 is empty (step 1303). If the search node queue 827 is not empty (NO in step 1303), the search unit 813 extracts, as a source node, one node from the search node queue 827 (step 1304) and performs a node movement process (step 1305).

The search unit 813 then checks, by referencing the path list 828, whether there is a common node that directly or indirectly references all the corresponding nodes identified in step 1301 (step 1306). If there is no common node that directly or indirectly all the corresponding nodes (NO in step 1306), the search unit 813 repeats step 1303 and the subsequent steps.

However, if there is a common node that directly or indirectly references all the corresponding nodes (YES in step 1306), the search unit 813 generates the search result 829 including information representing the common nodes that have been detected. Then, the output unit 814 outputs the search result 829 (step 1307). In this case, for each of all the common nodes that have been detected, information representing the common node and information representing corresponding nodes directly or indirectly referenced by the common node are included in the search result 829.

If the search node queue 827 is empty (YES in step 1303), the node search apparatus 801 performs step 1307.

Figure 15:
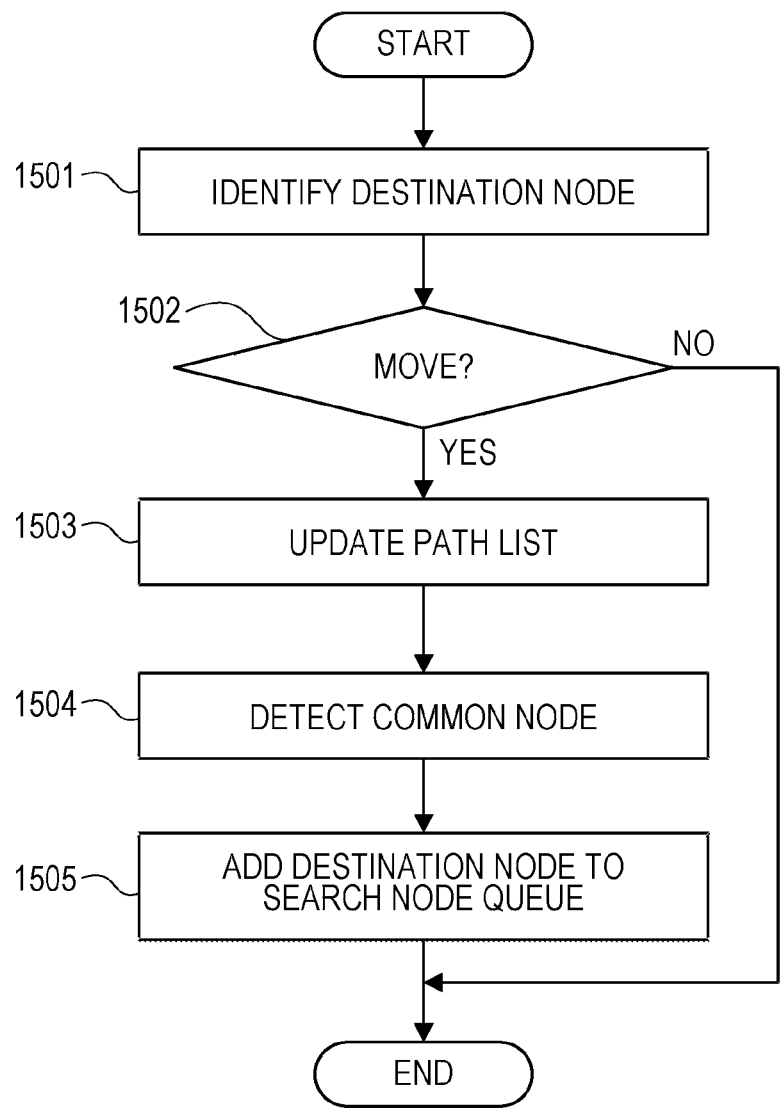
FIG. 15 is a flowchart of a node movement process.

FIG. 15 is a flowchart illustrating an example of the node movement process in step 1305 in FIG. 13. The search unit 813 first identifies, as the destination node, a node that is not the source node of the nodes at both ends of a link that references the source node in the RDF data set 825 (step 1501). Then, the search unit 813 determines whether to move a search location from the source node to the destination node (step 1502).

For example, if either a condition (C1) or a condition (C2) mentioned below is satisfied, the search unit 813 determines that there is an association between the ontologies of the source node and the destination node. In this case, it is determined that the search location is to be moved from the source node to the destination node.

(C1) The co-occurrence statistics 823 for a link that references the source node and a link that references the destination node is greater than a predetermined value a.

For example, a is a value specified by the user, and a may be equal to zero. In the case where there is no link that references the destination node, the co-occurrence statistics 823 is set to a very large value. In this case, the maximum value of a 64-bit floating-point number may be used as the co-occurrence statistics 823.

(C2) Important words included in the label and the comment of a link that references the source node overlaps important words included in the label and the comment of a link that references the destination node.

An important word included in the label and the comment of a link is, among words included in the label and the comment, a word having the importance statistics 824 greater than a predetermined value 3. When at least one important word of a link that references the source node is the same as at least one important word of a link that references the destination node, it is determined that the important words of these links overlap. For example, β is a value specified by the user.

However, if neither the condition (C1) nor the condition (C2) is satisfied, the search unit 813 determines that there is no association between the ontologies of the source node and the destination node. In this case, it is determined that the search location is not to be moved from the source node to the destination node.

In the case where a plurality of links reference the source node in the RDF data set 825, for each of the destination nodes at the ends of these links, the search unit 813 determines whether to move the search location.

In the case where a plurality of links reference the destination node, for all combinations of these links and links that reference the source node, the search unit 813 determines whether either the condition (C1) or the condition (C2) is satisfied. When, for any of the combinations, either the condition (C1) or the condition (C2) is satisfied, the search unit 813 determines that the search location is to be moved.

If the search location is to be moved (YES in step 1502), the search unit 813 updates the path list 828 (step 1503) and detects a common node based on the updated path list 828 (step 1504). The search unit 813 then adds the destination node to the search node queue 827 (step 1505). The added destination node is extracted as a new source node in step 1304 in FIG. 13.

However, if the search location is not to be moved (NO in step 1502), the search unit 813 does not update the path list 828 and completes the process.

In the path list 828, an entry representing the path of each node detected in the node detection process is included. An entry representing the path of a node m includes identification information of one or more nodes that are present between any corresponding node and the node m in the RDF data set 825. When the node m is a corresponding node, the entry includes only the identification information of the node m. In step 1503, the search unit 813, for example, updates the path list 828 in the following procedure.

(P31) The search unit 813 obtains, from the path list 828, an entry E0 representing the path of the source node.

(P32) The search unit 813 deletes the entry E0 from the path list 828.

(P33) The search unit 813 adds the identification information of the destination node to the entry E0 to generate an entry E1 representing the path of the destination node. In the case where there are a plurality of destination nodes, the entry E1 is generated for each destination node.

(P34) The search unit 813 adds the entry E1 to the path list 828.

(P35) The search unit 813 checks entries included in the path list 828, and if there are a plurality of entries representing the path of the same node, the search unit 813 deletes these entries from the path list 828. The search unit 813 then combines the deleted entries to generate a new entry E2 and adds the entry E2 to the path list 828.

Figure 16:
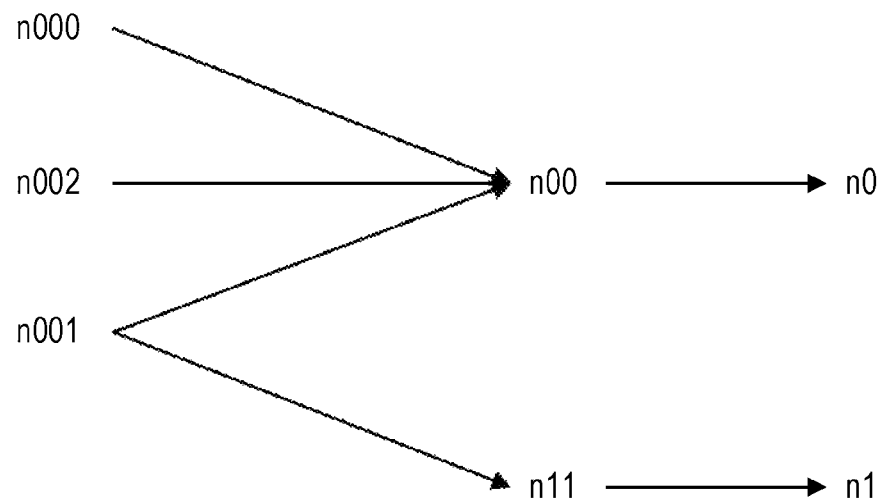
FIG. 16 is a diagram illustrating paths.

FIG. 16 illustrates an example of paths included in the RDF data set 825. In the example, n0, n1, n00, n11, n000, n001, and n002 represent nodes and arrows between nodes represent links. In the example, n0 and n1 are corresponding nodes.

Figure 17A:
FIG. 17A and FIG. 17B are diagrams illustrating path lists.
Figure 17B:
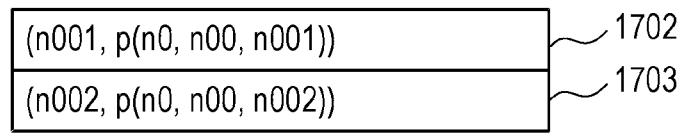

FIG. 17A and FIG. 17B illustrate examples of the path list 828 representing paths in FIG. 16. FIG. 17A illustrates an example of the entry E0 obtained from the path list 828. An entry 1701 represents the path of the source node n00, and p(n0, n00) represents nodes that are present on a path from the corresponding node n0 to the source node n00.

FIG. 17B illustrates an example of the entry E1 generated from the entry E0 in FIG. 17A. In this case, the destination nodes that are available for movement from the source node n0 are nodes n000 to n002. When, among these nodes, the destination node n001 and the destination node n002 are determined as the destinations of movement of the search location, an entry 1702 and an entry 1703, which represent the paths of these destination nodes, are generated as the entry E1.

In the entry 1702, p(n0, n00, n001) represents nodes that are present on a path from the corresponding node n0 to the destination node n001. In the entry 1703, p(n0, n00, n002) represents nodes that are present on a path from the corresponding node n0 to the destination node n002.

Figure 18A:
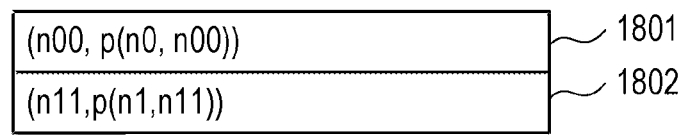
FIG. 18A, FIG. 18B, and FIG. 18C are diagrams illustrating path lists including common nodes.
Figure 18B:
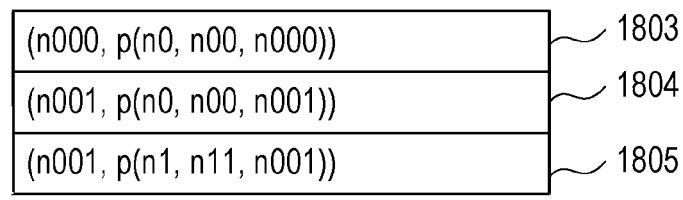
Figure 18C:
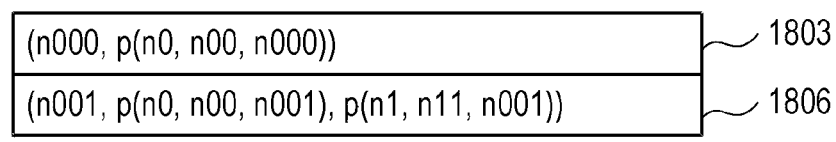

FIG. 18A, FIG. 18B, and FIG. 18C illustrate examples of the path list 828 including common nodes. FIG. 18A illustrates an example of the entry E0 obtained from the path list 828. An entry 1801 represents the path of the source node n00, and an entry 1802 represents the path of the source node n11. In the entry 1801, p(n0, n00) represents nodes that are present on a path from the corresponding node n0 to the source node n00, and p(n1, n11) of the entry 1802 represents nodes that are present on a path from the corresponding node n1 to the source node n11.

FIG. 18B illustrates an example of the entry E1 generated from the entry E0 in FIG. 18A. When, among the destination nodes that are available for movement from the source node n00, the destination node n000 and the destination node n001 are determined as the destinations of movement of the search location, an entry 1803 and an entry 1804, which represent the paths of these destination nodes, are generated as the entry E1.

In the entry 1803, p(n0, n00, n000) represents nodes that are present on a path from the corresponding node n0 to the destination node n000. In the entry 1804, p(n0, n00, n001) represents nodes that are present on the path from the corresponding node n0 to the destination node n001.

When the destination node n001, which is available for movement from the source node n11, is determined as the destination of movement of the search location, an entry 1805, which represents a path of the destination node n001, is generated as the entry E1. In the entry 1805, p(n1, n11, n001) represents nodes that are present on the path from the corresponding node n1 to the destination node n001.

FIG. 18C illustrates, in the procedure step (P35), an example of a new entry E2 generated from the entry 1804 and the entry 1805 in FIG. 18B. The entry 1804 and the entry 1805 represent paths of the same node n001 and therefore are deleted from the path list 828. An entry 1806 is generated by combining the entry 1804 and the entry 1805.

The entry 1806 includes the identification information of the node n001, p(n0, n00, n001) representing the path from the corresponding node n0 to the node n001, and p(n1, n11, n001) representing the path from the corresponding node n1 to the node n001.

Accordingly, by checking the entry 1806 in step 1504, the search unit 813 may detect that a path following links from the corresponding node n0 and a path following links from the corresponding node n1 intersect at the node n001. Thus, the node n001 is detected as a common node. In this case, the search unit 813 generates the search result 829 including identification information (n001, n0, n1) of the common node n001, the corresponding node n0, and corresponding node n1.

The configurations of the node search apparatus 601 in FIG. 6 and the node search apparatus 801 in FIG. 8 are merely exemplary, and some of the components thereof may be omitted or changed in accordance with the usage or conditions of the node search apparatus. For example, in the node search apparatus 801 in FIG. 8, when the co-occurrence statistics 823 and the importance statistics 824 are computed by an external device, or when the co-occurrence statistics 823 and the importance statistics 824 are not used, the computation unit 812 may be omitted.

The flow charts in FIG. 7, FIG. 12, FIG. 13, and FIG. 15, are merely exemplary, and part of the processes may be omitted or changed in accordance with the configuration or conditions of the node search apparatus. For example, in the node search process in FIG. 12, when the co-occurrence statistics 823 and the importance statistics 824 are computed by an external device, step 1201 and step 1202 may be omitted. In the node search process in FIG. 12, when the co-occurrence statistics 823 and the importance statistics 824 are not used, step 1201 and step 1202 may be omitted.

In step 1502 in FIG. 15, the search unit 813 may use only one of the condition (C1) or the condition (C2) to determine whether to move the search location or may use another condition to determine whether to move the search location. For example, the user may store, in the storage unit 811, a list representing combinations of two links for which there is an association between ontologies. In this case, the search unit 813 determines whether to move the search location by checking whether a combination of a link that references the source node and a link that references the destination node is included in the list.

The RDF data sets illustrated in FIG. 1 to FIG. 3, FIG. 4B, FIG. 5, and FIG. 9 to FIG. 11 are merely exemplary, and the RDF data set varies in accordance with the information described in RDF and the ontology used for description. The non-RDF data set illustrated in FIG. 4A is merely exemplary, and the non-RDF data set varies in accordance with information that is described.

The search node queue 827 illustrated in FIG. 14 is merely exemplary, and the corresponding nodes included in the search node queue 827 vary in accordance with the RDF data set 825 and the non-RDF data set 826. The paths illustrated in FIG. 16 and the examples of the path list 828 illustrated in FIG. 17A and FIG. 17B and FIG. 18A, FIG. 18B, and FIG. 18C are merely exemplary, and the paths and the path list 828 vary in accordance with the RDF data set 825 and the non-RDF data set 826.

Expression (1) to expression (15) are merely exemplary, and the search unit 813 may use other computational expressions to compute the co-occurrence statistics 823 and the importance statistics 824.

Figure 19:
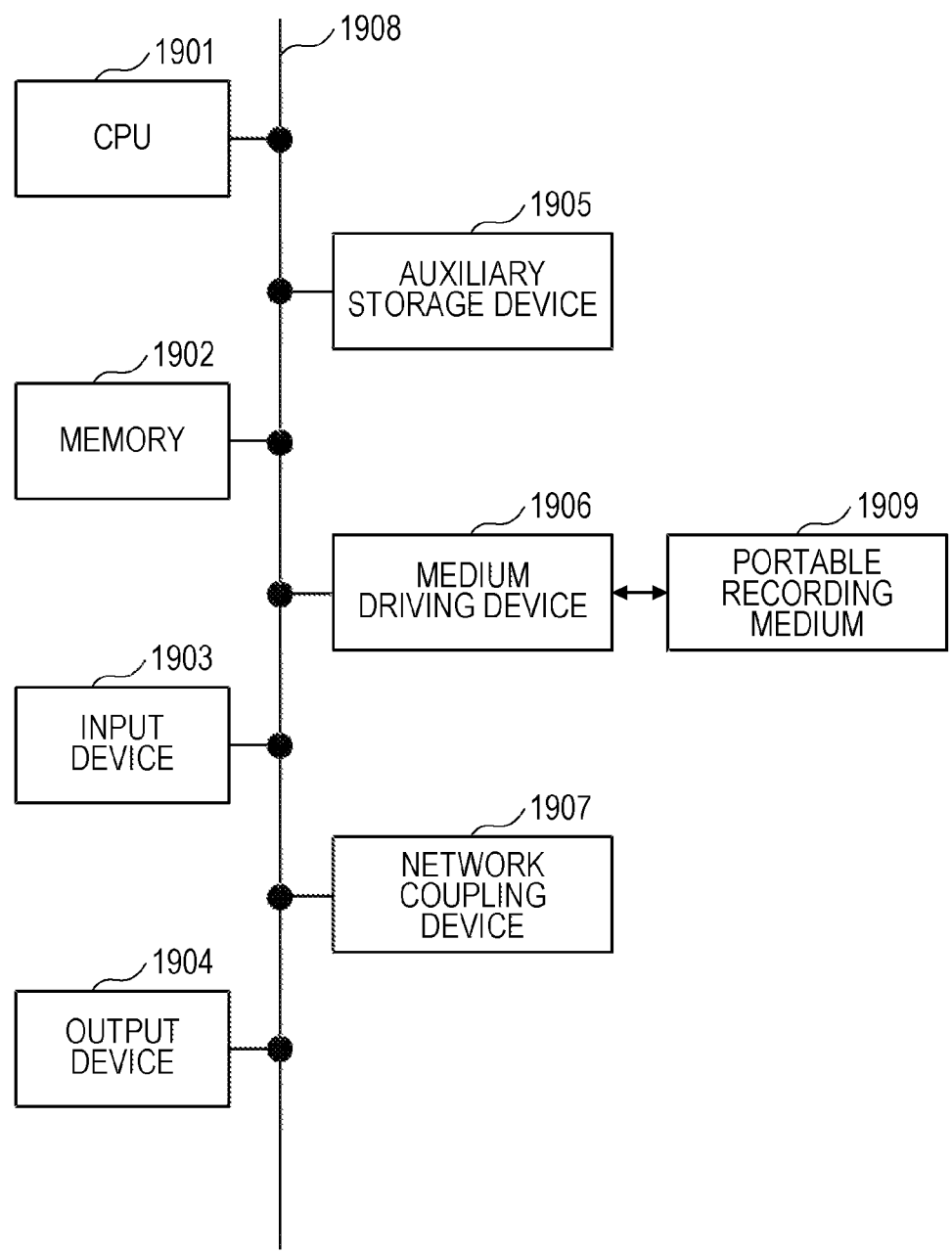
FIG. 19 is a diagram illustrating a configuration of an information processing apparatus.

FIG. 19 illustrates an example of a configuration of an information processing apparatus (computer) used as the node search apparatus 601 in FIG. 6 or the node search apparatus 801 in FIG. 8. The information processing apparatus in FIG. 19 includes a central processing unit (CPU) 1901, a memory 1902, an input device 1903, an output device 1904, an auxiliary storage device 1905, a medium driving device 1906, and a network coupling device 1907. These components are coupled to each other via a bus 1908.

The memory 1902 is, for example, a semiconductor memory such as a read-only memory (ROM), a random-access memory (RAM), or a flash memory, and stores programs and data that are used for processing. The memory 1902 may be used as the storage unit 611 in FIG. 6 or the storage unit 811 in FIG. 8.

The CPU 1901 (processor), for example, operates as the search unit 612 in FIG. 6 and the computation unit 812 and the search unit 813 in FIG. 8 by executing a program by using the memory 1902.

The input device 1903 is, for example, a keyboard, a pointing device, or the like and is used for input of an instruction or information from an operator or a user. The output device 1904 is, for example, a display device, a printer, a speaker, or the like, and is used for output of inquiries or instructions to the operator or a user, and processing results. The output device 1904 may be used as the output unit 613 in FIG. 6 or the output unit 814 in FIG. 8. The processing result may be the search result 829.

The auxiliary storage device 1905 is, for example, a magnetic disk drive, an optical disk drive, a magneto-optical disk drive, a tape drive, or the like. The auxiliary storage device 1905 may be a hard disk drive or a flash memory. The information processing apparatus stores programs and data in the auxiliary storage device 1905 and may use the programs and data by loading them into the memory 1902. The auxiliary storage device 1905 may be used as the storage unit 611 in FIG. 6 or the storage unit 811 in FIG. 8.

The medium driving device 1906 drives a portable recording medium 1909 and accesses data recorded therein. The portable recording medium 1909 is a memory device, a flexible disk, an optical disk, a magneto-optical disk, or the like. The portable recording medium 1909 may be a compact disc read-only memory (CD-ROM), a digital versatile disc (DVD), a Universal Serial Bus (USB) memory, or the like. An operator or a user may store programs and data in the portable recording medium 1909 and may use the programs and data by loading them into the memory 1902.

As described above, a computer-readable recording medium in which programs and data to be used for processing are stored is a physical (non-transitory) recording medium like the memory 1902, the auxiliary storage device 1905, or the portable recording medium 1909.

The network coupling device 1907 is a communication interface circuit that is coupled to a communication network such as a local area network (LAN) or a wide area network (WAN) and performs data conversion associated with communication. The information processing apparatus may receive programs and data from external devices via the network coupling device 1907 and may use the programs and data by loading them into the memory 1902. The network coupling device 1907 may be used as the output unit 613 in FIG. 6 or the output unit 814 in FIG. 8.

Via the network coupling device 1907, the information processing apparatus may receive the RDF data set 825, the non-RDF data set 826, and a processing request from a user terminal and may transmit the search result 829 to the user terminal.

The information processing apparatus is not required to include all the components in FIG. 19, and part of the components may be omitted in accordance with the usage or conditions. For example, in the case where the information processing apparatus receives a processing request from a user terminal, the input device 1903 and the output device 1904 may be omitted. In the case where the portable recording medium 1909 or a communication network is not used, the medium driving device 1906 or the network coupling device 1907 may be omitted.

Although the disclosed embodiment and its advantages have been described in detail, a person skilled in the art could make various changes, additions, omissions without departing from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node search method executed by a computer, the node search method comprising:
    identifying, from among nodes included in a first data set described based on a plurality of ontologies each defining a link referencing a node in the first data set, a group of nodes corresponding to respective pieces of data included in a second data set;
    on a path following links included in the first data set from each of the identified group of nodes, determining whether there is an association between a first ontology of a first link referencing a source node from which tracing of links is to be started and a second ontology of a second link referencing a destination node at which the tracing of links is to be ended, by
        extracting, from an ontology that defines each of links included in a plurality of data sets, words included in a label and a comment for each link,
        determining a number of occurrences of each of the words that occurs in the label and the comment for each link,
        calculating, by using the determined number of occurrences, importance statistics indicating importance of each word, and
        determining an association between the first ontology of the first link referencing the source node and the second ontology of the second link referencing the destination node by using first importance statistics indicating importance of each word included in a label and a comment for the first link and second importance statistics indicating importance of each word included in a label and a comment for the second link;
    by tracing links between the source node and the destination node based on a result of the determining, searching for a common node at which a first path following links from a first node of the group of nodes and a second path following links from a second node of the group of nodes intersect; and
    outputting a search result that includes information representing the common node, information representing the first node, and information representing the second node.

2. The node search method of claim 1, further comprising:
    when it is determined that there is an association between the first ontology and the second ontology, tracing links between the source node and the destination node to set the destination node as a new source node, and continuing search on the path from the new source node; and
    when it is determined that there is no association between the first ontology and the second ontology, terminating search on the path including the source node.

3. The node search method of claim 1, further comprising:
    for a combination of two links included in each of a plurality of data sets, determining a number of occurrences of events in which the two links simultaneously occur;
    calculating co-occurrence statistics for the two links by using the determined number of occurrences; and
    based on co-occurrence statistics for the first link that references the source node and the second link that references the destination node, determining an association between the first ontology for the source node and the second ontology for the destination node.

4. A non-transitory, computer-readable recording medium having stored therein a program for causing a computer to execute a process comprising:
    identifying, from among nodes included in a first data set described based on a plurality of ontologies each defining a link referencing a node in the first data set, a group of nodes corresponding to respective pieces of data included in a second data set;
    on a path following links included in the first data set from each of the identified group of nodes, determining whether there is an association between a first ontology of a first link referencing a source node from which tracing of links is to be started and a second ontology of a second link referencing a destination node at which the tracing of links is to be ended, by
        extracting, from an ontology that defines each of links included in a plurality of data sets, words included in a label and a comment for each link,
        determining a number of occurrences of each of the words that occurs in the label and the comment for each link,
        calculating, by using the determined number of occurrences, importance statistics indicating importance of each word, and
        determining an association between the first ontology of the first link referencing the source node and the second ontology of the second link referencing the destination node by using first importance statistics indicating importance of each word included in a label and a comment for the first link and second importance statistics indicating importance of each word included in a label and a comment for the second link;
    by tracing links between the source node and the destination node based on a result of the determining, searching for a common node at which a first path following links from a first node of the group of nodes and a second path following links from a second node of the group of nodes intersect; and outputting a search result that includes information representing the common node, information representing the first node, and information representing the second node.

5. The non-transitory, computer-readable recording medium of claim 4, the process further comprising:

when it is determined that there is an association between the first ontology and the second ontology, tracing links between the source node and the destination node to set the destination node as a new source node, and continuing search on the path from the new source node; and when it is determined that there is no association between the first ontology and the second ontology, terminating search on the path including the source node.

6. The non-transitory, computer-readable recording medium of claim 4, the process further comprising:

for a combination of two links included in each of a plurality of data sets, determining a number of occurrences of events in which the two links simultaneously occur;

calculating co-occurrence statistics for the two links by using the determined number of occurrences; and based on co-occurrence statistics for the first link that references the source node and the second link that references the destination node, determining an association between the first ontology for the source node and the second ontology for the destination node.

7. An apparatus comprising:

a memory; and a processor coupled to the memory and configured to:

identify, from among nodes included in a first data set described based on a plurality of ontologies each defining a link referencing a node in the first data set, a group of nodes corresponding to respective pieces of data included in a second data set, on a path following links included in the first data set from each of the identified group of nodes, determine whether there is an association between a first ontology of a first link referencing a source node from which tracing of links is to be started and a second ontology of a second link referencing a destination node at which the tracing of links is to be ended, by extract, from an ontology that defines each of links included in a plurality of data sets, words included in a label and a comment for each link, determine a number of occurrences of each of the words that occurs in the label and the comment for each link, calculate, by using the determined number of occurrences, importance statistics indicating importance of each word, and determine an association between the first ontology of the first link referencing the source node and the second ontology of the second link referencing the destination node by using first importance statistics indicating importance of each word included in a label and a comment for the first link and second importance statistics indicating importance of each word included in a label and a comment for the second link, by tracing links between the source node and the destination node based on a result of the determining, search for a common node at which a first path following links from a first node of the group of nodes and a second path following links from a second node of the group of nodes intersect, and output a search result that includes information representing the common node, information representing the first node, and information representing the second node.

* * * * *